(12) United States Patent
Dooley et al.

(10) Patent No.: US 9,493,676 B2
(45) Date of Patent: Nov. 15, 2016

(54) FORMULATION COMPOSITION FOR FLUORINATED ORGANOSILOXANE NETWORK

(71) Applicant: XEROX CORPORATION, Norwalk, CT (US)

(72) Inventors: Brynn Mary Dooley, Toronto (CA); Adrien Pierre Cote, Clarkson (CA); Anthony James Wigglesworth, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 269 days.

(21) Appl. No.: 13/847,195

(22) Filed: Mar. 19, 2013

(65) Prior Publication Data

US 2014/0285570 A1    Sep. 25, 2014

(51) Int. Cl.
| C09D 183/08 | (2006.01) |
| B41J 2/14 | (2006.01) |
| B41J 2/16 | (2006.01) |
| B41J 11/00 | (2006.01) |
| C08G 77/24 | (2006.01) |

(52) U.S. Cl.
CPC .......... *C09D 183/08* (2013.01); *B41J 2/14008* (2013.01); *B41J 2/1433* (2013.01); *B41J 2/164* (2013.01); *B41J 2/1606* (2013.01); *B41J 11/0015* (2013.01); *C08G 77/24* (2013.01)

(58) Field of Classification Search
CPC .............. C09D 183/08; C09D 183/14; Y10T 428/24777; Y10T 428/24802
USPC ..................... 428/192, 195.1; 528/34, 35, 36
See application file for complete search history.

(56) References Cited

U.S. PATENT DOCUMENTS

| 5,389,958 | A | 2/1995 | Bui et al. |
| 7,226,982 | B2* | 6/2007 | Yamaya et al. ................. 528/35 |
| 7,842,753 | B2* | 11/2010 | Yamaya et al. ............... 524/858 |
| 2004/0125169 | A1* | 7/2004 | Nakagawa et al. ............ 347/45 |
| 2007/0123606 | A1 | 5/2007 | Toma et al. |
| 2009/0043025 | A1* | 2/2009 | Tsujimoto et al. ........... 524/263 |
| 2009/0046125 | A1 | 2/2009 | Nystrom et al. |
| 2012/0242749 | A1 | 9/2012 | Moorlag et al. |

OTHER PUBLICATIONS

U.S. Appl. No. 13/746,634, filed Jan. 22, 2013 to Brynn Dooley et al.

* cited by examiner

*Primary Examiner* — Gerard Higgins
(74) *Attorney, Agent, or Firm* — Pillsbury Winthrop Shaw Pittman LLP

(57) ABSTRACT

A formulation composition for preparing a print head face plate coating includes a sol containing a mixture of monomers including at least one fluoroalkyl alkoxysilane monomer; a solvent; a catalyst; and water. The formulation composition is stable towards gelation for more than 1.5 hours. A method of preparing a print head involves preparing a formulation composition containing a sol prepared from a mixture of monomers including at least one fluoroalkyl alkoxysilane monomer, a solvent, a catalyst, and water; applying the formulation composition as a sol on a surface of the print head; and curing the formulation composition to form a crosslinked siloxane layer on the print head. A method of printing involves using the print head to apply inkjet ink to a substrate.

17 Claims, 2 Drawing Sheets

FORMULATION COMPOSITION FOR FLUORINATED ORGANOSILOXANE NETWORK

TECHNICAL FIELD

The present disclosure is generally related, in various embodiments, to coatings for print heads. More particularly, the disclosure relates to a formulation composition for producing a coating for a face plate of an ink jet print head.

RELATED APPLICATIONS

U.S. Patent Application Publication No. 2012/0242749 to Moorlag et al. describes a topcoat layer for ink jet printer components comprising a cross-linked material comprised of siloxyfluorocarbon.

U.S. patent application Ser. No. 13/746,634 to Dooley et al. describes a crosslinked siloxane composition comprising a polymerization product of a mixture comprising from about 2 to about 12 alkoxysilane precursor materials; wherein at least one of the alkoxysilane precursor materials is a hydrophilic alkoxysilane precursor material, and at least one of the alkoxysilane precursor materials is a hydrophobic alkoxysilane precursor material.

The entire disclosure of the above-mentioned application is totally incorporated herein by reference.

BACKGROUND

Ink-jet printing generally involves ejecting ink droplets from orifices in a print head onto some type of receiving media to form a desired image. Printers for use in such printing may use, for example, solid ink or phase change ink. Solid ink or phase change ink printers may receive ink in a solid form, sometimes referred to as solid ink sticks. The solid ink sticks may be inserted through an insertion opening of an ink loader for the printer, and may be moved by a feed mechanism and/or gravity toward a heater plate. The heater plate melts the solid ink impinging on the plate into a liquid that is delivered to a print head assembly for jetting onto a recording medium. The recording medium may be, for example, paper or a liquid layer supported by an intermediate imaging member, such as a metal drum or belt.

A print head assembly of a phase change ink printer may include one or more print heads, each having a plurality of ink jets from which drops of melted solid ink are ejected towards the recording medium. The ink jets of a print head receive the melted ink from an ink supply chamber (or manifold) in the print head which, in turn, receives ink from a source, such as a melted ink reservoir or an ink cartridge. Each ink jet includes a channel having one end connected to the ink supply manifold. The other end of the ink channel has an orifice or nozzle for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or print head assembly are moved relative to each other, the deposited drops can be precisely patterned to form particular text and graphic images on the recording medium. An example of a full width array print head is described in U.S. Patent Application Publication No. 2009/0046125, which is hereby incorporated by reference herein in its entirety. An example of an ultra-violet curable ink that can be jetted in such print head is described in U.S. Patent Application Publication No. 2007/0123606, which is hereby incorporated by reference in its entirety.

One difficulty faced by fluid ink jet systems is wetting, drooling, or flooding of inks onto the print head face plate. This may occur as a result of ink contamination of the print head face plate. FIG. 1 illustrates a face plate 5. As shown, the face plate 10 of the print head face plate 5 is displayed with the ink nozzles 15 located along the center strip of the face plate 10. The image shown displays an example of flooding, where ink has drooled 20 out of the nozzles 15 to result in print head failure. The contaminated face plate can cause or contribute to non-firing or missing drops, undersized or otherwise wrong-sized drops, satellites, or misdirected drops on the recording medium, and thus may result in degraded print quality.

Several material-based approaches have been proposed to address this problem, such as, for example, adding hydrophobic properties to a coating for use as a layer on the print head face plate. Hydrophobicity may be imparted, for example, by integrating fluorine content into the material, and coating the material onto the print head face plate. However, the coating process may not be a straightforward procedure. For example, the coating may be created by sol-gel polymerization, and the coating is ideally applied when the coating is in the sol phase. Gelation may occur upon standing or with heat treatment. However, the fluorinated material may not have a reliable pot life, and could gel before the fluorinated material could be applied as a wet layer on the substrate. For example, the coating solution may sometimes gel instantaneously or within a few minutes of preparing the coating solution.

As such, there is desired a formulation composition that has a reliable pot life, such that it can be applied to, for example, a print head face plate as an ungelled wet layer, while still producing, upon curing, an antiwetting coating for the ink jet print head that maintains high drool pressure and low ink adhesion over the life of the part.

SUMMARY

The present disclosure provides a formulation composition for preparing a print head face plating coating, where the formulation composition contains a sol containing a mixture of monomers including at least one fluoroalkyl alkoxysilane monomer; a solvent; a catalyst; and water; where the formulation composition is stable towards gelation for more than 1.5 hours.

In embodiments, the present disclosure further provides a method of preparing a print head involving preparing a formulation composition including a sol containing a mixture of monomers including at least one fluoroalkyl alkoxysilane monomer, a solvent, a catalyst, and water; applying the formulation composition as a sol on the surface of a print head; and curing the formulation composition to form a cross-linked siloxane network layer on the surface of the print head, where the formulation composition is stable towards gelation for more than 1.5 hours.

In embodiments, the present disclosure also provides a method of printing an image to a substrate, involving preparing a formulation composition including a sol containing a mixture of monomers including at least one fluoroalkyl alkoxysilane monomer, a solvent, a catalyst, and water; applying the formulation composition as a sol on the face plate of an inkjet print head; curing the formulation composition to form a crosslinked siloxane layer on the face plate of the inkjet print head; and applying an inkjet ink to a substrate suing the inkjet print head; where the formulation composition is stable towards gelation for more than 1.5 hours.

EMBODIMENTS

Figure 1:
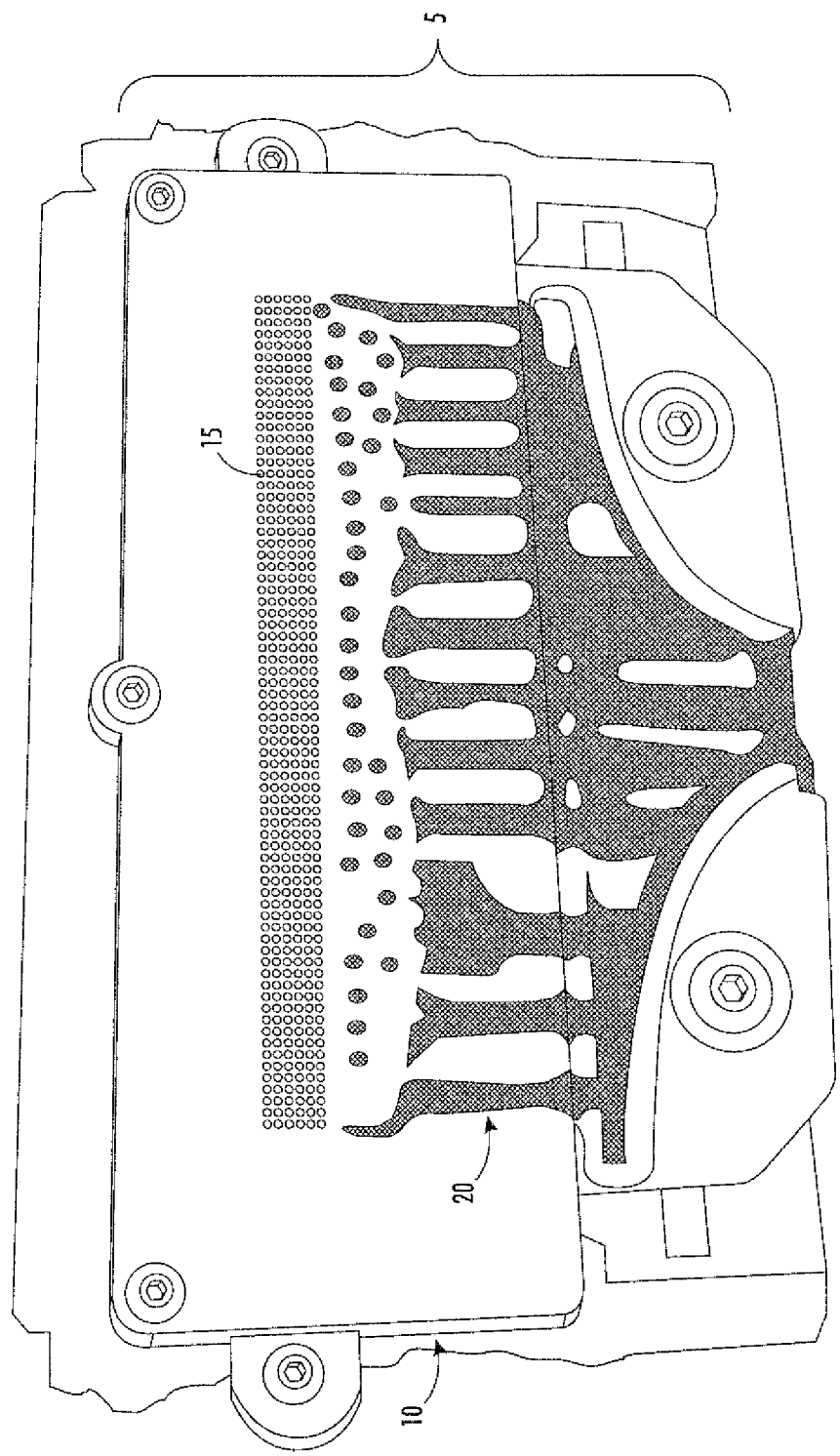
FIG. 1 is an illustration of a face plate exhibiting drooling.

In this specification and the claims that follow, singular forms such as "a," "an," and "the" include plural forms unless the content clearly dictates otherwise.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60, or from about 2 to about 30, or from about 4 to about 20. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

In embodiments, the instant disclosure provides a formulation composition (also referred to as a "composition" or "formulation" interchangeably) exhibiting high formulation stability (in that the formulation may remain ungelled for a predetermined amount of time, such as greater than about 1.5 hours, or greater than about 2 hours, or greater than about 4 hours, or greater than about 6 hours, or greater than about 8 hours). Such a composition may be cured to prepare a crosslinked siloxane network, such as a fluorinated organosiloxane network (fOSN). In embodiments, the formulation composition of the present disclosure may be cured on a surface of an inkjet print head (such as a face plate), forming a crosslinked siloxane layer on the print head. The coatings produced according to the present disclosure are thermally stable, and may be tailored to have anti-wetting and non-stick interactions with inks, such as solid ink or UV curable ink, which allows the inks to easily wick from the surface, even after prolonged exposure times. The coatings are also resistant to surface wear or damage.

In embodiments, a "substantially defect-free coating" or "defect-free coating" may be formed from the formulation composition of the present disclosure deposited on the surface of an underlying substrate, such as on a surface of an inkjet print head (such as a face plate). The term "substantially defect-free coating" refers, for example, to an coating that may or may not be removed from the underlying substrate on which it was formed and contains substantially no pinholes, pores or gaps greater than 5 microns per square cm; such as, for example, less than 10 pinholes, pores or gaps greater than about 5 microns in diameter per $cm^2$, or less than 5 pinholes, pores or gaps greater than about 5 microns in diameter per $cm^2$. The term "defect-free coating" refers, for example, to a coating that may or may not be removed from the underlying substrate on which it was formed and contains no pinholes, pores or gaps per $cm^2$.

In general, fluorinated organosiloxane networks are highly crosslinked materials containing organic segments bound together via siloxane linkages. These materials exhibit high thermal robustness and high mechanical strength. The surface and mechanical properties of a fluorinated organosiloxane network can be tailored for particular applications by selecting suitable building blocks and coating formulations. That is to say, the fluorinated organosiloxane networks according to the instant disclosure are tunable materials whose properties can be varied through the selection of the type and amount of particular precursors used to produce the fluorinated organosiloxane networks. The tunability of fluorinated organosiloxane networks makes them an attractive materials platform for anti-wetting coatings in general, such as anti-wetting coatings for inkjet face plates.

In embodiments, the formulation compositions according to the instant disclosure exhibit a formulation stability of greater than about 1.5 hours, such as greater than about 2 hours, or greater than about 4 hours, or greater than about 8 hours, or greater than about 10 hours, such as from about 1.5 to about 24 hours, or from about 2 to about 16 hours, or from about 3 to about 8 hours, and may be cured to form crosslinked siloxane compositions. In other words, the formulation compositions according to the instant disclosure are stable towards gelation for more than 1.5 hours, such as more than about 2 hours, or more than about 4 hours, or more than about 6 hours, or more than about 8 hours, or more than about 10 hours. In contrast the formulation compositions of the present disclosure, unstable formulation compositions (which may gel immediately or quickly after being formulated, such as within about 1.5 hours, or within about 30 minutes, or within about 5 minutes, or within about 1 minute, or within about 30 seconds) gel before the formulation composition can be applied (for example, as a coating on a print head face plate), and gelation then precludes efficient and uniform application. Because the pot life of the formulation compositions according to the instant disclosure is more than about 1.5 hours, the available time window for application of the formulation composition as a stable wet layer allows for a composition that the well-suited for use in manufacturing coating processes.

In embodiments, the formulation composition according to the instant disclosure may be applied to a surface of an inkjet print head, such as an inkjet print head front plate, as a stable wet layer. In embodiments, the formulation composition may be cured to form a crosslinked siloxane coating on the surface of the inkjet print head, such as a crosslinked siloxane coating on the front plate of the inkjet print head. The coatings produced by the methods of the instant disclosure are thermally robust and exhibit good solid ink antiwetting characteristics. In addition, the coating produced according to the instant disclosure exhibits no chemical interaction with the ink. That is to say, the crosslinked siloxane coatings prepared according to the instant disclosure exhibit very low adhesion with inks, such as UV ink and solid ink, as measured by an ink wicking test so that ink drops on the print head face plate are removed and leave no residue. In embodiments, a droplet of ink forms a sliding angle with the coating of the instant disclosure that is less than about 30°, such as less than about 25°, or less than about 20°, or less than about 15°. For example, in embodiments, the sliding angle may be from about 1° to about 30°, such as from about 1° to about 20°. The crosslinked siloxane coatings produced according to the instant disclosure thereby enable production of high quality, high throughput printed images with inks, such as ultra-violet curable ink or solid ink, that are ejected from a print head, wherein the images are free from print defects due to misdirected droplets or missing jets caused by face plate drooling of the ink experienced with previous print head face plate coatings.

The formulation compositions according to the instant disclosure may be applied to a variety of substrates, including stainless steel and polyimide, using a variety of solution-based processing methods (spray, dip, blade coatings), yielding a suitable thickness predetermined by the user. The formulation compositions may be selected to produce a fluorinated organosiloxane network having strong adhesion to a given substrate (i.e., face plate surface, such as stainless steel or polyimide) without the need for surface modification or the use of promoters, allowing for a primer-free application.

In embodiments, jetted drops of ultra-violet curable ink or jetted drops of solid ink can exhibit a contact angle with the crosslinked siloxane composition prepared according to the instant disclosure that is greater than about 40°, such as from about 140° to about 40°, or from about 110° to about 45°, or from about 100° to about 50°. When ink is filled into the print head, it is desirable to maintain the ink within the print head nozzle until it is time to eject the ink. Generally, the greater the ink contact angle, the better (or higher) the holding (or drooling) pressure. The high contact angle of the crosslinked siloxane composition according to the instant disclosure (such as when used as an ink jet print head coating) can improve de-wetting and jetted ink quality, as well as eliminate weeping. As used herein, the term "holding pressure" refers to the a measurement of the ability of an aperture nozzle plate to avoid ink wetting out of the nozzle opening when the pressure of the ink tank (reservoir) increases. The composition according to the instant disclosure can provide an improved holding pressure and/or reduced (or eliminated) weeping of ink out of the nozzle.

Figure 2:
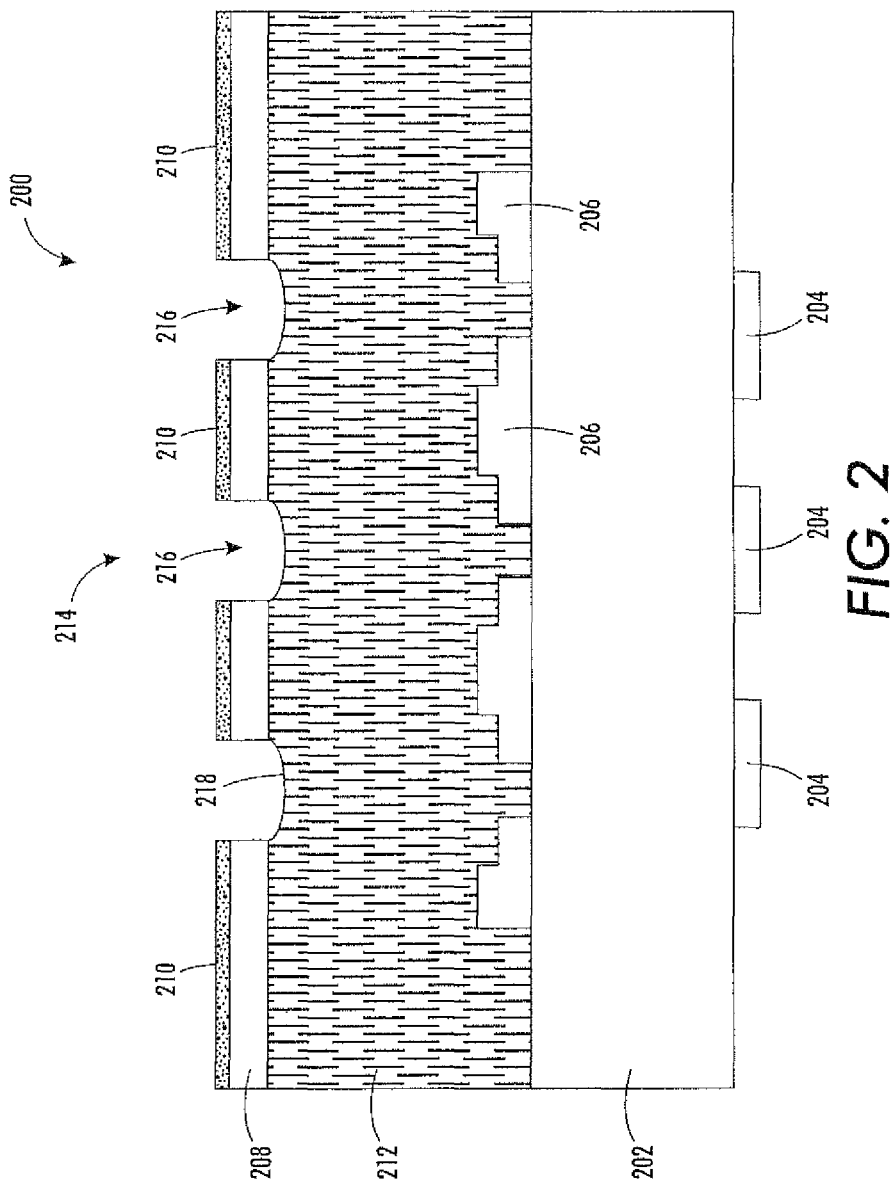
FIG. 2 is an illustration of a print head having a coating according to the instant disclosure.

In embodiments, the present disclosure provides a formulation composition for producing a crosslinked siloxane coating, which may be used as a print head face plate coating. The coatings of the present disclosure may be used with any type of print head. FIG. 2 illustrates a print head 200 having a coating 210 prepared according to the instant disclosure disposed thereon. The print head 200 includes a base substrate 202 with transducers 204 on one surface and acoustic lenses 206 on an opposite surface. Spaced from the base substrate 202 is a liquid level control plate 208. A coating 210 in accordance with the present disclosure is disposed along plate 208. In embodiments, the coating may have a thickness ranging from about 100 nm to about 20 μm, such as ranging from about 500 nm to about 10 μm, or ranging from about 1 μm to about 5 μm.

The base substrate 202 and the liquid level control plate 208 define a channel, which holds a flowing liquid 212. The liquid level control plate 208 contains an array 214 of apertures 216. The transducers 204, acoustic lenses 206, and apertures 216 are all axially aligned such that an acoustic wave produced by a single transducer 204 will be focused by its aligned acoustics 206 at approximately a free surface 218 of the liquid 212 in its aligned aperture 216. When sufficient power is obtained a droplet is emitted from surface 218.

The coating 210 produced in accordance with the present disclosure may be disposed on the print head face plate along plate 208 and may provide the print head face plate with sliding angle characteristics to prevent ink from accumulating near the nozzles and interfering with the jetting of the ink droplets. In embodiments, the coating 210 may provide the print head face plate with sliding angle characteristics such that satellite droplets of ink, such as UV curable ink and solid ink, landing on the nozzle plate exhibit a low sliding angle.

In embodiments, a droplet of ink forms a sliding angle with the coating of the instant disclosure that is less than about 30°, such as less than about 25°, or less than about 20°, or less than about 15°. For example, in embodiments, the sliding angle may be from about 1° to about 30°, such as from about 1° to about 20°.

Formulation Composition for Preparing a Crosslinked Siloxane Coating

As discussed above, in embodiments, the instant disclosure provides a formulation composition to produce a crosslinked siloxane composition, such as a crosslinked siloxane coating on an inkjet print head face plate. In embodiments, the formulation composition may comprise a sol prepared from a mixture of monomers comprising at least one fluoroalkyl alkoxysilane monomer; a solvent; a catalyst, and water. In embodiments, the formulation composition is stable towards gelation for more than about 1.5 hours, such as more than about 2 hours, or more than about 4 hours, or more than about 8 hours, or more than about 10 hours, such as from about 1.5 to about 24 hours, or from about 2 to about 16 hours, or from about 3 to about 8 hours. In embodiments, stable formulations may be produced by balancing the amount of monomer with the amount of catalyst, and by using a suitable amount of alcohol-based solvent. In embodiments, the formulation compositions may be applied to a substrate while in the sol phase, and gelation may occur upon standing or with heat treatment.

In embodiments, the sol may be prepared with a mixture of monomers comprising at least one fluoroalkyl alkoxysilane monomer. In embodiments, the mixture of monomers comprising at least one fluoroalkyl alkoxysilane monomer may comprise linear or branched hydrocarbons. In embodiments, the mixture of monomers comprising at least one fluoroalkyl alkoxysilane monomer may include siloxyfluorocarbon (SFC) precursors. SFC precursors are designed to incorporate fluorinated chains that add flexibility and low-surface energy character to the resulting material. A variety of SFC precursors with varying siloxane and fluorocarbon components may be used to prepare the formulation composition according to the instant disclosure, including di- and tri-alkoxysilanes, linear and branched fluoroalkanes, and fluoroarenes.

In embodiments, the at least one fluoroalkyl alkoxysilane monomer may be represented by the structure:

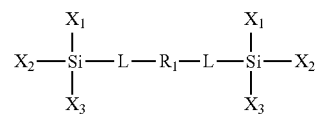

where $R_1$ is an aliphatic or aromatic fluorocarbon chain; L is a $C_nH_{2n}$ linker group, where n is a number between 0 and 10, such as from about 1 to about 8, or from about 2 to about 6; and $X_1$, $X_2$, and $X_3$ are reactive hydroxide functionalities, reactive alkoxide functionalities, unreactive aliphatic functionalities of from about 1 carbon atom to about 10 carbon atoms, such as from about 2 carbon atoms to about 8 carbon atoms, or from about 3 carbon atoms to about 6 carbon atoms, or unreactive aromatic functionalities of from about 1 carbon atom to about 10 carbon atoms, such as from about 2 carbon atoms to about 8 carbon atoms, or from about 3 carbon atoms to about 6 carbon atoms. For example, in embodiments, the formulation composition according to the instant disclosure may be prepared with 1,10-bis(methyl diisopropoxysilyl)-3,3,4,4,5,5,6,6,7,7,8,8-dodecafluorodecane I:

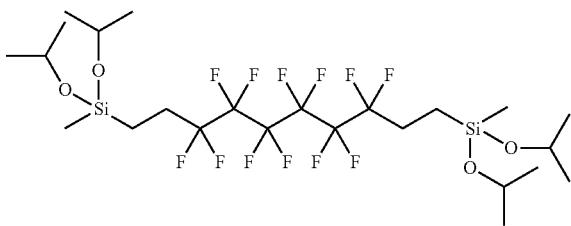

In addition to the monomers listed above, the formulation composition according to the instant disclosure may be prepared using monomers having the following structure:

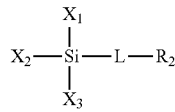

where $R_2$ represents a fluorocarbon chain, which may be aliphatic, aromatic, or contain mixtures of aliphatic or aromatic fluorocarbon chains; L is a $C_nH_{2n}$ linker group, where n is a number between 0 and about 10, such as from about 1 to about 8, or from about 2 to about 6; and $X_1$, $X_2$, and $X_3$ are as defined above. In embodiments, $R_2$ may be a $CF_3$-terminated fluorocarbon chain. In embodiments, the formulation composition according to the instant composition may be prepared with a mixture of monomers where from about 0% to about 50% of the monomers contain terminal $CF_3$ moieties, such as from about 5% to about 40% of the monomers, or from about 10 to about 35% of the monomers. In embodiments, the formulation composition according to the instant disclosure may be prepared using diisopropoxy(3,3,4,4,5,5,6,6,7,7,8,8,8-tridecafluorooctyl)methylsilane II:

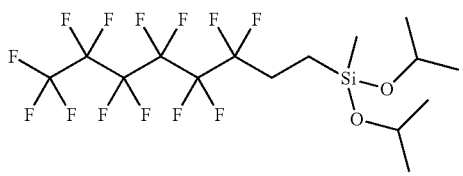

In embodiments, a formulation composition according to the instant disclosure may be prepared using from 0 to about 100 weight percent of a monosilane that is a fluoroalkyl alkoxysilane, for example II, (relative to disilane, for example I), such as from 0 to about 50 weight percent of a monosilane that is a fluoroalkyl alkoxysilane, or from 5 to about 45 weight percent of a monosilane that is a fluoroalkyl alkoxysilane, or from about 10 to about 40 weight percent of a monosilane that is a fluoroalkyl alkoxysilane.

In addition to the monomers listed above, the formulation composition may be prepared using monomers selected from the group consisting of silicon tetraalkoxide and branched pentasilanes. The silicon tetraalkoxide may be generally represented by the respective structure:

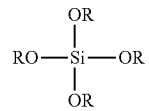

where R may be hydrogen, methyl, ethyl, propyl, isobutyl, other hydrocarbon groups, or mixtures thereof. The branched pentasilanes may be generally represented by the respective structure:

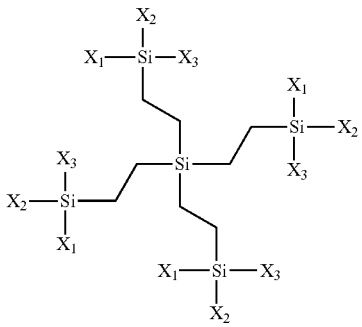

where $X_1$, $X_2$, and $X_3$ are as defined above.

The formulation composition may comprise monomers having a fluorine content of from about 15 weight percent to about 65 weight percent, such as from about 25 weight percent to about 60 weight percent, or from about 30 weight percent to about 50 weight percent. The silicon content, by weight, is from about 1 weight percent to about 30 weight percent silicon, such as from about 2 weight percent to about 20 weight percent silicon, or from about 5 weight percent to about 15 weight percent silicon.

Sol-Gel Polymerization

Siloxyfluorocarbon monomers may be crosslinked via solution-gelation (or "sol-gel") chemistry, where hydrolysis and condensation of alkoxide or hydroxide groups occurs and upon curing at elevated temperatures, produces a crosslinked siloxane coating that may be used as a coating, such as for print head face plates. The crosslinked siloxane coating prepared according to the instant disclosure can withstand high temperature conditions without melting or degradation, is mechanically robust under such conditions, and displays good release under such conditions.

A general process for forming sol-gels is discussed, for example, in C. J. Brinker & G. Scherer, Sol-Gel Science: The Physics and Chemistry of Sol-Gel Processing (Academic Press, Boston, 1990), and U.S. Patent Application Publication No. 2007/0082207, the disclosures of which are incorporated herein by reference in their entireties. This two-step reaction process, which transforms a miscible one-phase liquid solution into a two-phase material, is called "sol-gel transition." Generally, an alkoxysilane/solvent/water mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the polymer network or entrapped in the polymer structure.

The monomers are networked together so that all monomers are bonded together in the cured coating via silicon oxide (Si—O—Si) linkages. Therefore, a molecular weight cannot be given for the siloxyfluorocarbon networked polymer because the coating is crosslinked into one system.

In embodiments, one can use metal alkoxide (M=Si, Al, Ti, and so forth) functionalities as cross-linking components between fluorocarbon chains. For cross-linking to occur efficiently throughout the composite, bifunctional fluorocarbon chains are used. Mono-functional fluorocarbon chains can also be added to enrich fluorination content. $CF_3$-terminated chains align at the fusing surface to reduce surface energy and improve release.

Examples of precursors that may be used to form a crosslinked siloxane composition include silicon tetraalkoxide and siloxane-terminated fluorocarbon chains and are shown below. Siloxane-based sol-gel precursors are commercially available. The addition of a silicon tetraalkoxide (such as a silicon tetraalkoxide, below) introduces extra cross-linking and robustness to the material, but is not necessary to form the crosslinked siloxane composition.

$Si(OR)_4$
Silicon
Tetraalkoxide

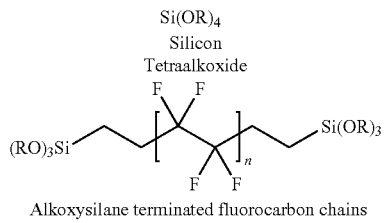
Alkoxysilane terminated fluorocarbon chains where R is as defined above, and n may be a number of from about 1 to about 10, such as from about 2 to about 9, or from about 3 to about 8.

Fluorocarbon chains include readily available dialkene precursors which can then be converted to silanes via hydrosilation (Reaction 1). Monofunctional fluorinated siloxane chains are commercially available as methyl or ethyl siloxanes, or could be converted from chlorosilane or dialkene precursors.

Reaction 1: Preparation of Fluorocarbon chain silicon alkoxide precursors

Shown below are some fluorinated and siloxane precursors that are commercially available. Fluorocarbon and siloxane materials are available from a variety of vendors including Gelest, Synquest, Apollo Scientific, Fluorochem, TCI America, Anachemica, Lancaster Synthesis Inc., and Polysciences Inc.

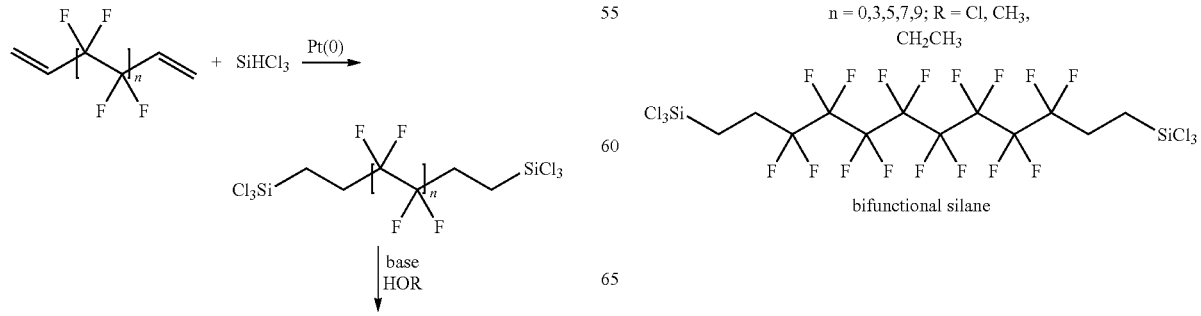

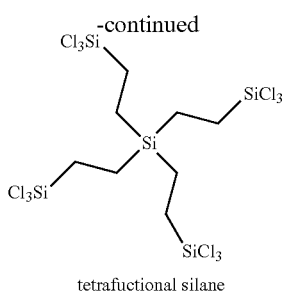

tetrafuctional silane

A representation of an example of a crosslinked composite system incorporating both monofunctional and difunctional fluorinated siloxane chains is shown in Structure 1. In this example, mechanical properties and fluorination content can be modified by adjustment of the ratio of mono- to difunctional precursors.

Structure 1: Representative of a sol-gel/fluorocarbon composite system.

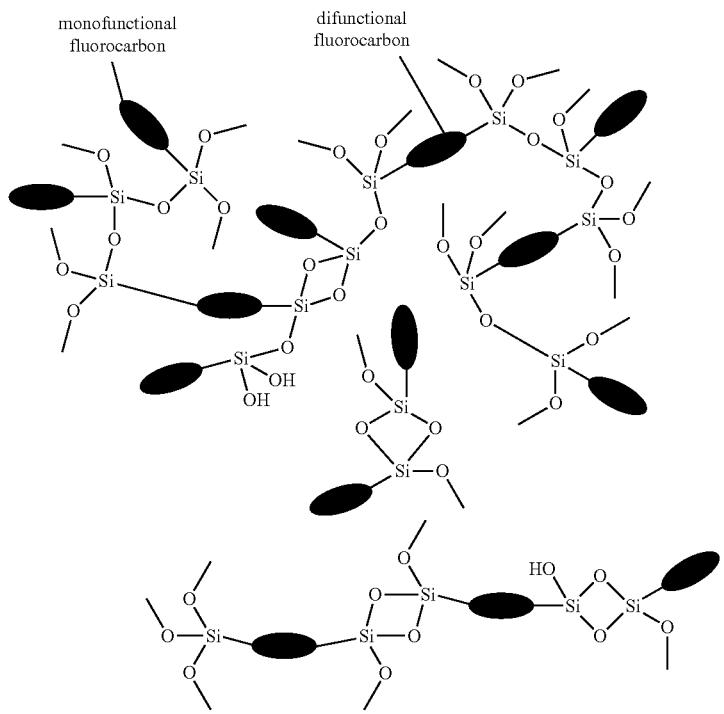

Solvents used for sol-gel processing of siloxyfluorocarbon precursors and coating of layers include organic hydrocarbon solvents, and fluorinated solvents. Alcohols such as methanol, ethanol, and isopropanol are used to promote sol-gel reactions in solution. Further examples of solvents include ketones such as methyl ethyl ketone, and methyl isobutyl ketone. Mixtures of solvents may be used. In embodiments, the solvent may be an alcohol solvent. In embodiments, the alcohol solvent may be present in an amount of at least 20 weight percent of the formulation composition, such as from about 20 weight percent to about 70 weight percent, or from about 30 weight percent to about 50 weight percent of the formulation composition.

In embodiments, the solvent system may include the addition of a portion of water, such as from about 1 molar equivalent to 10 molar equivalents of water compared to siloxyfluorocarbon precursors or the siloxane terminated fluorocarbons, or from about 2 molar equivalents to about 6 molar equivalents of water.

Upon the addition of water to the solution of sol gel precursors, alkoxy groups react with water, and condense to form agglomerates that are partially networked, and are referred to as a sol. The sol may form a gel upon standing or upon drying. In embodiments, a sol prepared according to the instant disclosure may be stable towards gelation for more than about 1.5 hours, such as more than about 2 hours, or more than about 4 hours, or more than about 8 hours, or more than about 10 hours, such as from about 1.5 to about 24 hours, or from about 2 to about 16 hours, or from about 3 to about 8 hours. Accordingly, in embodiments, the sol may be applied to a substrate as a stable wet layer (that is to say, the formulation composition may be applied while still in the sol phase) more than about 1.5 hours after the sol is prepared, such as more than about 2 hours after the sol is prepared, or more than about 4 hours after the sol is prepared, or more than about 8 hours after the sol is prepared, or more than about 10 hours after the sol is prepared.

In embodiments, the viscosity of the sol may be from about 1 cPs to about 10 cPs, such as from about 2 to about 9 cPs, or from about 3 to about 8 cPs, when the sol is prepared. In embodiments, the viscosity of the sol when the sol is applied to a substrate (that is, more than about 1.5 hours after the sol was prepared, such as more than about 2 hours after the sol was prepared, or more than about 4 hours after the sol was prepared, or more than about 6 hours after the sol was prepared, or more than about 8 hours after the sol was prepared, or more than about 10 hours after the sol was prepared) may be within about 5% of the viscosity of the sol at preparation, such as within about 3%, or within about 1%, or within about 0.5% of the viscosity of the sol at preparation.

In embodiments, the sol may be applied to a substrate (such as a surface of an inkjet print head, such as a face plate for an inkjet print head) while in the sol state. Following coating of the sol onto a substrate, a gel may be formed upon standing or from drying with heat treatment, forming a fully networked siloxane coating on the substrate.

In embodiments, the crosslinked siloxane composition does not dissolve when exposed to solvents (such as ketones, chlorinated solvents, ethers etc.), does not degrade at temperatures up to 350° C., and is stable at higher temperatures, depending on the system. In embodiments, the crosslinked siloxane composition does not display ink wetting when the composition is exposed to solid or UV ink or ink base, such that ink and other marking-related materials do not adhere to the face plate when the crosslinked siloxane composition is formed as a coating on an inkjet print head face plate.

In embodiments, the coating solution may be deposited on a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, web-coating, roll-coating, extrusion molding, laminating, or the like. The thickness of the coating solution may be from about 100 nm to about 20 μm, such as from about 500 nm to about 10 μm, or from about 1 μm to about 5 μm.

In some embodiments, a coating technique that may be used is meniscus coating of steel surfaced jetstacks while applying positive pressure to the apertures to prevent their occlusion during coating. When making polyimide aperture plates, the jet openings are formed by laser ablation after coating. The coating can include laser absorptive materials to aid the ablation process.

As discussed above, stable formulation compositions may be produced by balancing the amount of monomer to the amount of catalyst, and by using a sufficient amount of solvent, such as alcohol-based solvent. In embodiments, a solution of monomers in ethanol or another alcohol, such as methanol or isopropanol, or a mixture containing alcohol, where the solvent is present in an amount of at least 20 weight percent of the formulation composition. The formulation composition may be prepared by adding water from about 1 molar equivalent to about 10 molar equivalents of water compared to siloxyfluorocarbon precursors or the siloxane terminated fluorocarbons, or from about 2 molar equivalents to about 6 molar equivalents of water, with a catalytic amount of acid or base to initiate networking. In embodiments, the catalyst is a hydroxide ion catalyst present in an amount of from about 0.1 mol % to about 5 mol % hydroxide ion per silicon atom, such as from about 0.2 mol % to about 3 mol %, or from about 0.3 mol % to about 1 mol %.

In embodiments, solids loading of from about 20 weight percent to about 80 weight percent, such as from about 30 weight percent to about 70 weight percent, or from about 40 weight percent to about 60 weight percent, may be employed.

By balancing the components of the formulation composition as described above, a formulation composition having a reliable pot life may be produced. For example, in embodiments, the formulation composition thus produced may be stable (remain ungelled) for more than 1.5 hours, such as more than 1.5 hours, or more than 2 hours, or more than 4 hours, or more than 8 hours, or more than 10 hours. That is to say, the sol formulation may not experience a significant change in viscosity (such as greater than 5% change in viscosity, or greater than 3% change in viscosity, or greater than 1% change in viscosity) for more than 1.5 hours after being formulated, such as more than 2 hours, or more than 4 hours, or more than 8 hours, or more than 10 hours. In embodiments, the viscosity of the formulation composition is from about 1 to about 10 cPs, such as from about 2 to about 9 cPs, or from about 3 to about 8 cPs.

In embodiments, the sol thus produced may be filtered prior to coating. In embodiments, the sol may also be subjected to a pre-curing step following filtration, such as by heating at a temperature of from about 40° C. to about 60° C., such as from about 45° C. to about 55° C., for from about 10 to about 45 minutes, such as from about 20 to about 40 minutes, or from about 25 to about 35 minutes. In embodiments, pre-curing may take place before the sol is coated onto a substrate. In embodiments, pre-curing may take place after the sol is coated onto a substrate.

In embodiments, the formulation composition may be coated on a substrate, forming a layer of the formulation composition on the substrate. In embodiments, after coating, the formulation composition layer may be air-dried and heat-treated. In embodiments, following air-drying and heat-treatment between 100° C. to 250° C., the formulation composition layer will network to yield a coating. The siloxane functionalities will self-bond to form the network, and may also bond to a variety of substrates. For example, siloxy functionalities may bind to substrates of metals, ceramics, and polymers. In embodiments, metal substrates may include aluminum, steel, gold, silicon and mixtures thereof. Ceramic substrates may include glass, quartz, metal oxides, and mixtures thereof. Polymer substrates may include polyimide, polyimide, polycarbonate, polyester, polyetherketone, polyetherimide, polyethersulfone, polysulfone, liquid crystal polymer, and mixtures thereof. In embodiments, the crosslinked siloxane coatings prepared according to the instant disclosure display adhesion to the substrates previously mentioned, and cannot be removed by a significant amount of rubbing or scratching the surface.

In embodiments, the formulation composition may be coated on a surface of an inkjet print head, such as a print head face plate. The formulation may be cured to yield a crosslinked siloxane layer on the surface of the inkjet print head. In such embodiments, the crosslinked siloxane layer has an increased adherence to the face plate (such as a metal or polymer face plate) and increased wear resistance as compared to a face plate coating without the crosslinked siloxane composition. In embodiments, the topcoat layer also exhibits little or no adhesion with solid or ultraviolet curable inks at a temperature of from about 40 to about 180° C. as compared to a topcoat layer without crosslinked siloxane composition.

In embodiments, an inkjet print head with a front face having a crosslinked siloxane coating prepared according to the methods of the instant disclosure may be used in printing an image to a substrate. For example, in embodiments, the inkjet print head prepared according to the instant disclosure may be used to apply an inkjet ink to a substrate. In embodiments, the face plate of the inkjet print head has excellent wear resistance, such that the inkjet print coating surface maintains a low sliding angle even after 200 cleaning cycles with a Crock cloth, wherein the low sliding angle is from about 1° to less than about 50°, or from about 1° to less than about 30°.

In embodiments, minimal attraction between the coated surface and inks may be attributed to the low surface energy of the crosslinked siloxane coating material. The inherent strength of this ceramic/fluorocarbon hybrid and self-adhesion to surfaces makes these coatings good candidates for a primer-free topcoat. As shown in Table 1, siloxyfluorocarbon coatings on silicone substrates have been found to display surface energy values slightly higher than that of polyfluoro-alkoxy (PFA), and about the same magnitude as a fluoroelastomer available under the tradename VITON (available from E. I. du Pont de Nemours and Company (Wilmington, Del.)). It has been shown that surface energy is decreased significantly with extension of the fluorocarbon chain length of the precursor and corresponding increase in fluorine content. In embodiments, the surface energy can be modified by the choice of precursor. That is to say, in embodiments, the surface energy of the crosslinked siloxane layer may be adjusted by increasing or decreasing the fluorine content of the monomers used to produce the formulation composition that is cured to produce the crosslinked siloxane layer.

heated above a threshold temperature, referred to in some instances as a melt temperature. The ambient temperature is the temperature of the air surrounding the imaging device; however, the ambient temperature may be at room temperature (about 20° C. to about 25° C.) when the imaging device is positioned in an enclosed or otherwise defined space. Melt temperatures for phase change ink may be, for example, from about 70° C. to about 140° C., such as from about 80° C. to about 100° C., or from about 110° C. to about 130° C. When phase change ink cools below the melt temperature, the ink returns to the solid phase.

As used herein, the terms "gel ink" and "gel based ink" refer, for example, to inks that remain in a gelatinous state at the ambient temperature and that may be heated or otherwise altered to have a different viscosity suitable for ejection by a print head. Gel ink in the gelatinous state may have a viscosity, for example, between from about 105 and 107 ¬ centipoise (cP); however, the viscosity of gel ink may be reduced to a liquid-like viscosity by heating the ink above

| Networked Material | Structure | Fluorine Content (%) | Surface Free Energy* (mN/m²) |
|---|---|---|---|
| Disiloxyfluorohexane | [structure diagram] | 48 | 23.46 |
| Disiloxyfluorooctane | [structure diagram] | 53 | 21.29 |
| Viton-GF | [structure diagram] Wherein n = 20-70% wt, m = 20-60% wt, and o = 0-40% wt. | 71 | 22.93 |
| PFA | [structure diagram] Wherein n = 1-5% wt, and m = 95-99% wt. | 75 | 19.75 |

Ink Materials

In embodiments, the formulation composition according to the present disclosure may be used to prepare a coating suitable for use with any suitable ink. Exemplary ink compositions include, for example, phase change inks, gel based inks, curable inks, aqueous inks, and solvent inks. As used herein, the term "ink composition" encompasses all colors of a particular ink composition including, for example, usable color sets of an ink composition. For example, an ink composition may refer to a usable color set of phase change ink that includes cyan, magenta, yellow, and black inks. Therefore, as defined herein, cyan phase change ink and magenta phase change ink are different ink colors of the same ink composition.

The term "phase change ink," also referred to as "solid ink," encompasses inks that remain in a solid phase at ambient temperature and that melt to a liquid phase when a threshold temperature, referred to as a gelation temperature. The gelation temperature may be, for example from about 30° C. to about 50° C., such as from about 31° C. to about 38° C., or from about 41° C. to about 48° C. The viscosity of the gel ink increases when the ink cools below the gelation temperature.

Some ink compositions, referred to herein as curable inks, may be cured by the imaging device. As used herein, the process of "curing" ink refers to curable compounds in an ink undergoing an increase in molecular weight in response to being exposed to radiation. Exemplary processes for increasing the molecular weight of a curable compound include, for example, crosslinking and chain lengthening. Cured ink is suitable for document distribution, is resistant to smudging, and may be handled by a user. Radiation suitable to cure ink may encompass the full frequency (or wavelength) spectrum including, for example, microwaves, infrared, visible, ultraviolet, and x-rays. For instance, ultraviolet-curable gel ink, referred to herein as UV gel ink, becomes cured after being exposed to ultraviolet radiation. As used herein, the term "ultraviolet" radiation encompasses radiation having a wavelength of from about 50 nm to about 500 nm.

EXAMPLES

The following examples are being submitted to illustrate embodiments of the present disclosure. These examples are intended to be illustrative only and are not intended to limit the scope of the present disclosure. Parts and percentages are by weight unless otherwise indicated.

Example 1

0 Weight % diisopropoxy(3,3,4,4,5,5,6,6,7,7,8,8,8-tridecafluorooctyl)methylsilane 1,10-bis(methyl diisopropoxysilyl)-3,3,4,4,5,5,6,6,7,7,8,8-dodecafluorodecane (9.00 grams, 13.3 mmol) was dissolved in n-butanol (8.50 grams). Tetrabutylammonium hydroxide catalyst (0.0778 grams, 0.4 mol % relative to Si) of a 1.0 M solution in MeOH (Sigma-Aldrich) and water (0.48 grams, 26.7 mmol, 1 equivalent relative to Si) were added to the solution to give a 50 weight percent solution. The formulation was mixed by vortex mixing (2500 rpm, 10 seconds), filtered through a 0.45 mm PTFE filter and allowed to stand for 30 minutes at 50° C. After cooling to room temperature (about 20° to about 25° C.), the solution was stable under ambient conditions for more than 2 hours.

Example 2

25 Weight % diisopropoxy(3,3,4,4,5,5,6,6,7,7,8,8,8-tridecafluorooctyl)methylsilane Relative to Total Monomer 1,10-bis(methyl diisopropoxysilyl)-3,3,4,4,5,5,6,6,7,7,8,8-dodecafluorodecane (0.755 grams, 1.1 mmol) and diisopropoxy(3,3,4,4,5,5,6,6,7,7,8,8,8-tridecafluorooctyl)methylsilane (0.241 grams, 0.47 mmol) were dissolved in n-butanol (0.603 grams). Tetrabutylammonium hydroxide catalyst (0.0113 grams, 0.5 mol % relative to Si) of a 1.0 M solution in MeOH (Sigma-Aldrich) and water (0.044 grams, 2.4 mmol, 0.9 equivalents relative to Si) were added to the solution to give a 60 weight percent solution. The formulation was mixed by vortex mixing (2500 rpm, 10 seconds), filtered through a 0.45 mm PTFE filter and allowed to stand for 30 minutes at 50° C. After cooling to room temperature, the solution was stable under ambient conditions for more than 2 hours.

Example 3

50 Weight % diisopropoxy(3,3,4,4,5,5,6,6,7,7,8,8,8-tridecafluorooctyl)methylsilane Relative to Total Monomer 1,10-bis(methyl diisopropoxysilyl)-3,3,4,4,5,5,6,6,7,7,8,8-dodecafluorodecane (0.494 grams, 0.73 mmol) and diisopropoxy(3,3,4,4,5,5,6,6,7,7,8,8,8-tridecafluorooctyl)methylsilane (0.498 grams, 0.98 mmol) were dissolved in n-butanol (0.460 grams). Tetrabutylammonium hydroxide catalyst (0.0205 grams, 1.0 mol % relative to Si) of a 1.0 M solution in MeOH (Sigma-Aldrich) and water (0.0508 grams, 2.82 mmol, 1.2 equivalents relative to Si) were added to the solution yielding a 65 weight percent solution. The formulation was mixed by vortex mixing (2500 rpm, 10 seconds), filtered through a 0.45 mm PTFE filter and allowed to stand for 30 minutes at 50° C. After cooling to room temperature, the solution was stable under ambient conditions for more than 2 hours.

Example 4

Preparation of a Coating

Formulations containing 0-50 weight percent relative to total monomer monosilane as a perfluoroalkylalkoxysilane (relative to the disilane) were prepared. The alkoxysilane mixture was dissolved in n-butanol or n-butanol/cyclopentanol mixtures to give 40 to 75 weight percent formulations. One molar equivalent of water and 0.3-1.0 mol % hydroxide ion catalyst (tetrabutylammonium hydroxide) were added to induce sol formation. The sols were stable (no significant change in viscosity) for more than two hours.

Hard coatings were prepared by filtering the sol and draw down coating the formulation on Upilex® (polyimide) substrate. The coatings were immediately cured at 160° C. or 180° C. for 30 minutes or 1 hour, yielding uniform 1-2 μm, clear, colorless films.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A formulation composition for preparing a print head face plate coating, the formulation composition comprising:
   a sol comprising
      a mixture of monomers comprising at least one fluoroalkyl alkoxysilane monomer and a branched pentasilane;
      from about 30 weight percent to about 50 weight percent of an alcohol solvent;
      a catalyst, wherein the catalyst is a soluble hydroxide catalyst which is present in an amount from about 0.3 mol % to about 1 mol % hydroxide ion per silicon atom; and
      from about 1 molar equivalent to about 10 molar equivalent of water relative to the fluoroalkyl alkoxysilane monomer;
         wherein formulation composition is stable towards gelation for more than 1.5 hours.

2. The formulation composition according to claim 1, wherein the mixture of monomers have a fluorine content of from about 15% to about 65% by weight.

3. The formulation composition according to claim 1, wherein from about 0% to about 50% by weight of the mixture of monomers contain terminal CF3 moieties.

4. The formulation composition according to claim 1, wherein the mixture of monomers comprises a monosilane fluoroalkyl alkoxysilane monomer and a disilane fluoroalkyl alkoxysilane monomer, and the monosilane fluoroalkyl alkoxysilane monomer are present in an amount of from 0 to about 50 weight percent relative to the disilane fluoroalkyl alkoxysilane monomer.

5. The formulation composition according to claim 1, wherein the formulation composition has a viscosity of from about 1 cPs to about 10 cPs.

6. The formulation composition according to claim 1, wherein the formulation composition forms a cross-linked siloxane network upon curing.

7. An ink jet print head face plate comprising:
a face plate; and
a coating layer disposed on the face plate;
wherein the coating layer is formed by depositing the formulation composition according to claim 1 on the faceplate, and curing the formulation composition to form a cross-linked siloxane layer on the face plate.

8. A method of preparing a print head, the method comprising:
preparing a formulation composition comprising a sol comprising
a mixture of monomers comprising at least one fluoroalkyl alkoxysilane monomer and a branched pentasilane;
from about 30 weight percent to about 50 weight percent of an alcohol solvent;
a catalyst, wherein the catalyst is a soluble hydroxide catalyst which is present in an amount from about 0.3 mol % to about 1 mol % hydroxide ion per silicon atom; and
from about 1 molar equivalent to about 10 molar equivalent of water relative to the fluoroalkyl alkoxysilane monomer;
applying the formulation composition as a sol on a surface of a print head; and
curing the formulation composition to form a cross-linked siloxane network layer on the surface of the print head;
wherein the formulation composition is stable towards gelation for more than 1.5 hours.

9. The method according to claim 8, wherein the formulation composition is cured to form the crosslinked siloxane layer more than 1.5 hours after the formulation composition is prepared.

10. The method according to claim 8, wherein the mixture of monomers have a fluorine content of from about 15% to about 65% by weight.

11. The method according to claim 8, wherein jetted drops of a UV curable ink or jetted drops of a solid ink on the crosslinked siloxane layer on the print head face plate exhibit a contact angle of from about 140° to about 40°.

12. The method according to claim 8, wherein the cross-linked siloxane network layer on the print head has a sliding angle that is less than about 30°.

13. A method of printing an image to a substrate, the method comprising:
preparing a formulation composition comprising a sol comprising
a mixture of monomers comprising at least one fluoroalkyl alkoxysilane monomer and a branched pentasilane;
from about 30 weight percent to about 50 weight percent of an alcohol solvent;
a catalyst, wherein the catalyst is a soluble hydroxide catalyst which is present in an amount from about 0.3 mol % to about 1 mol % hydroxide ion per silicon atom; and
from about 1 molar equivalent to about 10 molar equivalent of water relative to the fluoroalkyl alkoxysilane monomer;
applying the formulation composition as a sol on a face plate of an inkjet print head;
curing the formulation composition to form a crosslinked siloxane layer on the face plate of the inkjet print head;
applying an inkjet ink to a substrate using the inkjet print head;
wherein the formulation composition is stable towards gelation for more than 1.5 hours.

14. The method according to claim 13, wherein the formulation composition is cured to form the crosslinked siloxane layer more than 1.5 hours after the formulation composition is prepared.

15. The method according to claim 13, wherein the viscosity of the formulation composition when applied as a sol on the face plate of the inkjet print head is from about 1 cPs to about 10 cPs.

16. The method according to claim 13, wherein the mixture of monomers have a fluorine content of from about 15% to about 65% by weight, and the surface energy of the cross-linked siloxane layer may be adjusted by increasing or decreasing the fluorine content of the mixture of monomers.

17. The method according to claim 13, wherein the crosslinked siloxane layer forms a coating surface that maintains a low sliding angle of from about 1° to less than about 30° after 200 cleaning cycles with a crock cloth.

* * * * *